United States Patent [19]

Sassover et al.

[11] 3,987,408
[45] Oct. 19, 1976

[54] VEHICLE ANTI-THEFT SYSTEM
[75] Inventors: Nathan Sassover, New York; Mario Irizarry, Bronx, both of N.Y.
[73] Assignee: TMX, Inc., Farmingdale, N.Y.
[22] Filed: Jan. 30, 1973
[21] Appl. No.: 327,956

[52] U.S. Cl. .................................. 340/64; 180/114; 307/10 AT; 340/224
[51] Int. Cl.² ...................... B60R 25/04; G08B 1/08
[58] Field of Search ................ 340/53, 63, 64, 224, 340/276, 274; 343/225, 228; 325/37, 117, 390, 392, 393, 64; 307/10 AT; 180/114; 290/37 R, 37 A, 38; 317/134

[56] References Cited
UNITED STATES PATENTS

| | | | |
|---|---|---|---|
| 3,142,166 | 7/1964 | Adam et al. | 317/134 |
| 3,175,192 | 3/1965 | Keltner | 317/134 |
| 3,268,817 | 8/1966 | Hagey | 325/37 |
| 3,337,992 | 8/1967 | Tolson | 343/225 |
| 3,588,858 | 6/1971 | Demuth | 325/64 |
| 3,604,005 | 9/1971 | Gilmore | 325/393 |
| 3,611,287 | 10/1971 | Hoff et al. | 340/63 |
| 3,646,515 | 2/1972 | Vodehnal | 180/114 |
| 3,675,036 | 7/1972 | Davis | 340/64 |

Primary Examiner—John W. Caldwell
Assistant Examiner—Joseph E. Nowicki
Attorney, Agent, or Firm—Gottlieb, Rackman, Reisman & Kirsch

[57] ABSTRACT

An anti-theft system for cars and the like. A receiver is mounted in the trunk of the vehicle. A first receiver wire is connected to the electrical system of the car for supplying power to the receiver only when the ignition switch is turned on. A second, normally grounded, receiver wire is extended to the ignition coil for preventing operating of the ignition system. To remove the ground from this second conductor, it is necessary to operate a small transmitter while the ignition switch is turned on. The transmitter and the receiver are sold as a pair, the receiver being tuned to recognize a coded signal from only the paired transmitter. Once the ignition system is turned on, the disabling ground potential is held removed from the second conductor even though the transmitter is no longer operated. When the ignition system is subsequently turned off, the disabling potential is automatically applied to the second conductor and the anti-theft system is re-armed with no action being required of the driver other than the turning off of the ignition switch. A key-operated switch is provided on the receiver to allow the driver to de-activate the system when that is desired, for example, when the car is parked in a public garage.

9 Claims, 5 Drawing Figures

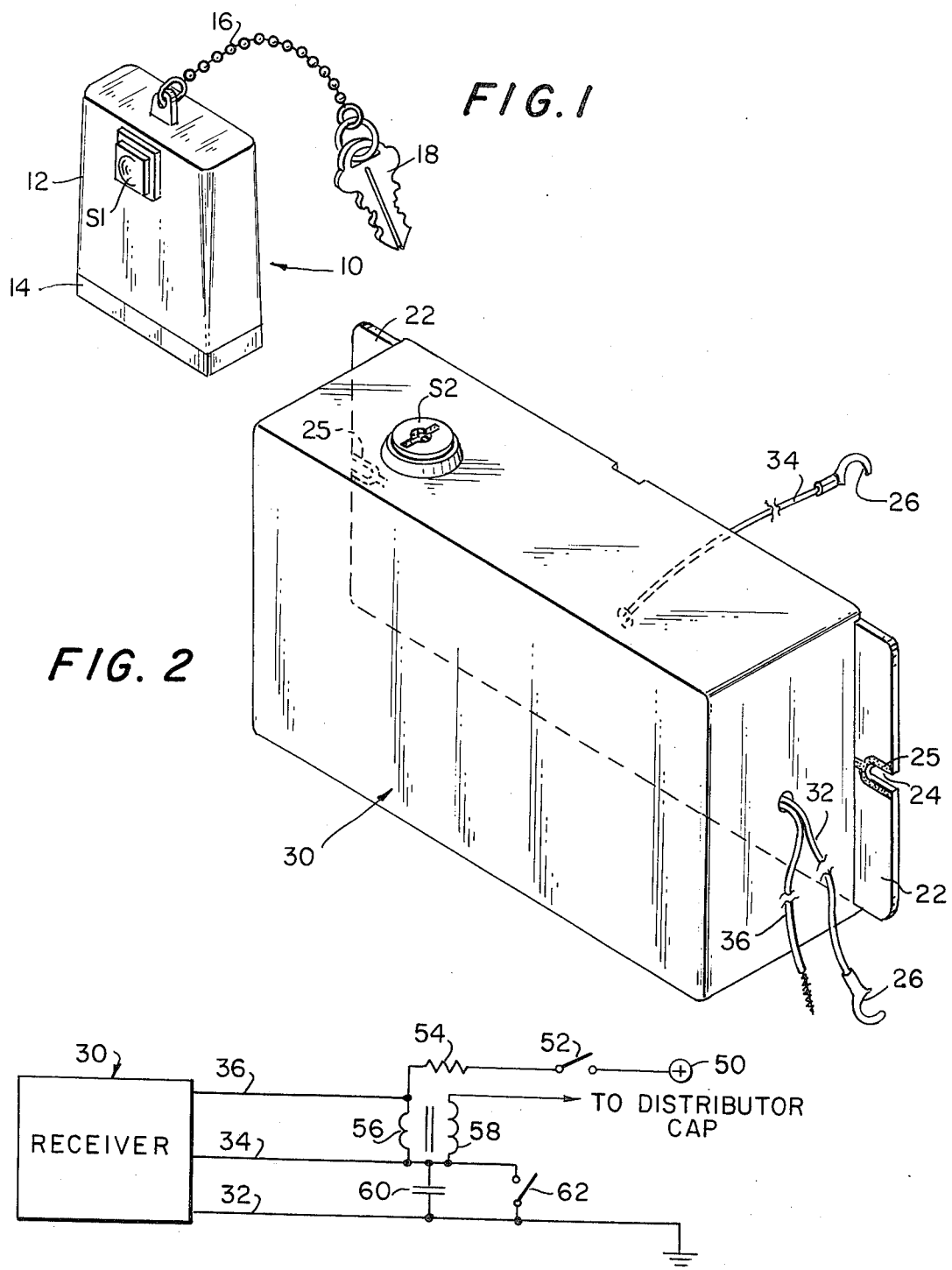

VEHICLE ANTI-THEFT SYSTEM

This invention relates to vehicle and other anti-theft systems, and more particularly to such systems which are more convenient to use and more effective for their intended purposes than prior art systems.

In recent years many different types of anti-theft systems have been designed and marketed. In many of these systems which are used in vehicles, the critical element is a key, often the ignition key. Keys are used to engage and disengage alarm systems, as well as steering wheel locks. One major shortcoming of a key-activated system, however, is that connecting wires may be jumped and the key switch may be by-passed. Equally significant is the fact that a key is often stolen or duplicated, in which case the vehicle is left totally unprotected. But perhaps most important is the fact that a vast percentage of the automobiles which are now being stolen have keys left in their ignition switches; it is apparent that in such a situation a key-activated system cannot offer any protection.

Other more sophisticated anti-theft systems require various mechanical procedures to enable the ignition system of an automobile to be turned on. Others require the memorization of special codes which can be keyed in by authorized operators. These systems, while perhaps more effective, are at the same time more difficult to use.

It is a general object of our invention to provide an anti-theft system which is highly effective and easy to use.

Briefly, in accordance with the principles of our invention, the vehicle owner is provided with a compact transmitter, of a size comparable to that of an ordinary cigarette lighter to facilitate its carrying. The transmitter is provided with a single push-botton switch which must be operated in order to start a vehicle in which the system is installed.

The transmitter is sold to the user together with a receiver. The receiver is secured to the vehicle; in the case of an automobile, the receiver is preferably secured to a wall inside the trunk. Three wires are extended out of the receiver and connected to the electrical system of the car. Two of the wires are connected respectively to chassis ground and to the battery through the ignition switch. The third wire is connected to a point in the electrical system of the car which can control disabling of the ignition system depending upon its voltage level. In the case of an automobile, the receiver operates to either ground this third (ignition cut-out) conductor or to leave it floating, and the conductor is connected to the ignition coil. When the conductor is grounded, the ignition coil does not operate and the ignition system remains off.

The system is designed to prevent the ignition system from turning on unless the transmitter is operated while the ignition key is inserted in the ignition switch and the switch is turned on. In the quiescent state, the receiver grounds the conductor extended to the ignition coil; turning on the ignition switch is not sufficient to start the car. However, if the transmitter is operated while the ignition switch is on, the receiver removes the ground on the cut-out conductor extended to the ignition coil, and the ignition system turns on. Thereafter, the conductor is left floating even after the transmitter is turned off so that the ignition system can continue to operate.

Significantly, after the car is parked and the ignition switch if turned off, the receiver automatically "re-arms" itself to disable the ignition system unless the transmitter is operated when the switch is next turned on. Thus the driver need not be concerned with setting the system after he parks the car. This is a distinct advantage over prior art systems installed in the vehicles of forgetful or lazy owners.

The transmitter and receiver are sold in matched pairs. Each transmitter is designed to transmit a predetermined audio tone modulated on a predetermined RF carrier, and the paired receiver is designed to unground the cut-out conductor extended to the ignition coil only if the correct audio tone on the correct RF carrier is detected while the ignition switch if turned on. In the illustrative embodiment of the invention, there are approximately 600 tone-carrier combinations for paired transmitters and receivers. (In the case of multiple operators, duplicate transmitters can be provided.) On a statistical basis, it is highly unlikely that a thief, even when equipped with several transmitters as well as the ignition key of a car, will be able to start the engine. If pulse codes rather than tone codes are used, a very large number of unique codes can be obtained.

It is possible to overcome the system by cutting the wires extended from the receiver to the electrical system of the car. However, cutting of either the battery wire or the ground wire has no effect on the system; the ignition system remains disabled. It is only by cutting the wire extended to the ignition coil that the system can be de-activated. But this is highly unlikely. To gain access to the receiver the trunk must first be forced open by a thief. Similar remarks apply to the case in which the receiver is placed under the hood at the front of the car. But in both of these situations, there is nothing visible inside the car to even suggest to the thief that the vehicle is equipped with an anti-theft system. (The wires which extend from the receiver, even when it is placed in the trunk, to the front of the car are all hidden, e.g., under the carpeting in the car, and there is no reason for a thief to suspect that there are any wires which if cut would allow the ignition system to turn on.) Instead, when a thief tries to start the car and discovers that the ignition system will not turn on, he is more likely to assume that there is something wrong with the car and he will try to steal some other.

There are some situations, however, in which it is advantageous not to require operation of the transmitter in order to start the car. For example, when parking the car in a public garage it is preferable not to give the transmitter to the attendant if he must be able to start the car in the driver's absence. For this reason, the receiver is provided with a key switch. For the sake of convenience, the key for operating this switch is actually attached by a chain to the transmitter carried by the vehicle owner. In order to disable the anti-theft system, the owner opens the trunk, inserts the key into the receiver, and turns the receiver off. This can be done before the driver even reaches the public garage. Once the receiver is turned off, the vehicle can be started in the ordinary manner. As soon as it is required to arm the system once again, the receiver switch is turned on; thereafter, in order to start the car, the transmitter button must be operated while the key is in the ignition switch.

The transmitter operates at a very low power level and therefore its battery need be changed at only infrequent intervals. So that the driver need not be required to secure a license from the Federal Communications Commission in order to use the transmitter, the timing and power level of Part 15 of the F.C.C. Rules and Regulations are observed. A low-power transmitter can be operated without a license if the transmitter is operated for no more than one second, with each operation being followed by at least 30 seconds during which the transmitter is unoperated. The transmitter of our invention is designed so that even if the push-botton switch is operated continuously by a driver, the coded signal is transmitted for no more than one second, at intervals spaced by more than thirty seconds.

Further objects, features and advantages of our invention will become apparent upon consideration of the following detailed description in conjunction with the drawing, in which:

FIG. 1 depicts the transmitter of our invention;

FIG. 2 depicts the paired receiver for use with the transmitter of FIG. 1;

FIG. 3 depicts the manner in which the receiver can be connected to the electrical system of a car;

Figure 4:
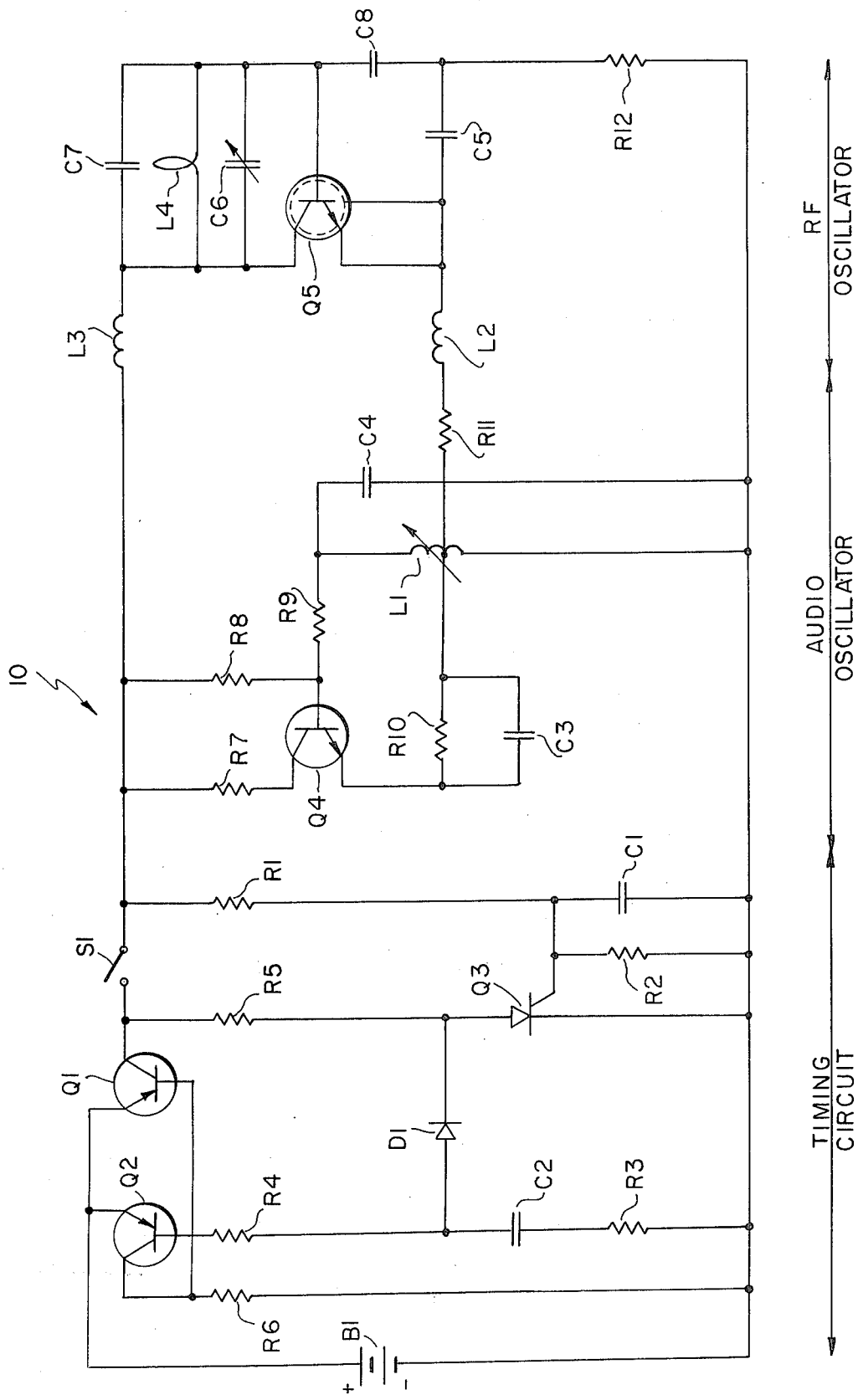
FIG. 4 depicts the circuitry of the transmitter of FIG. 1.

Transmitter 10 of FIG. 1 comprises a case 12 with a snap-on lid 14. During ordinary use, a 15-volt battery in the transmitter must be replaced at intervals of approximately six months. The snap-on lid and the receptacle within the transmitter case for holding the battery can be any of many types known in the art.

On the face of transmitter 10 there is a push-botton switch S1. It is when this switch is operated by the driver that the ignition system of the vehicle turns on, provided that the ignition switch is on at the same time. A key 18 is secured to the case by a chain 16. This key is used to de-activate the receiver when desired. When the receiver is de-activated, the ignition system on the vehicle can be turned on in the ordinary manner without requiring operation of the transmitter. Such de-activation is usually necessary prior to parking a vehicle in a public garage, or in the event the transmitter battery runs down and the transmitter cannot be operated. Key 18 is shown as being of the "double-edge" type. Preferably, such a key or a barrel-type key is provided with the transmitter; both of these keys are generally recognized to be pick-resistant. (The driver should not place his ignition key on the chain; in such a case, if the ignition key is left in a parked vehicle, so will be the transmitter.)

The receiver 30 of FIG. 2 has two mounting brackets 22 with slots 24. After a mounting area is selected in the vehicle, the receiver can be secured by two screws extended through slots 24. Two wires 32 and 36 extend out of a side of the receiver. Wire 32 is a ground wire and should be connected to chassis ground. This can be accomplished simply by attaching spade lug 26 attached to the wire to one of the screws used to mount the receiver. The receiver case is made of plastic but two laminated copper grounding strips 25 extend out of the case to insure that a secure ground is obtained. Wire 36 should be connected to a point in the electrical system that becomes "live" when the ignition key is turned on. It is the potential on wire 36 that powers the receiver.

Wire 34, on the end of which another spade lug 26 is provided, is extended out of the rear of the receiver. Accordingly, it is desirable to drill a hole in the wall on which the receiver is mounted so that wire 34 can be passed through it. Wire 34 is the ignition "cut-out" conductor which, as described above, is connected to the ignition coil. The receiver either grounds this wire or leaves it floating; when the wire is grounded the ignition system cannot be turned on. It is highly desirable that this wire be hidden from view even if a thief gains access to the receiver, for example, by forcing open the trunk of the car. If the ground wire conductor 32 is cut, the receiver will in all probability still be grounded by virtue of the fact that the receiver circuit is grounded via laminated copper grounded strips 25, i.e., it is connected electrically to chassis ground. If conductor 36 which is used to power the receiver is cut, this would simply prevent the ground on conductor 34 from being removed. Consequently, the cutting of wire 36 cannot defeat the system. It is only by cutting conductor 34 that the ignition system can turn on without operating the transmitter. By obscuring conductor 34 a thief who gains access to the trunk is unlikely to cut it. On the contrary, after cutting the two visible wires and finding that the ignition system still cannot be turned on, the thief is likely to abandon all efforts to steal the car.

At the top of the receiver there is a key switch S2. In the position shown, the receiver is activated. But when key 18 is inserted into switch S2 and the switch is turned off, the receiver is de-activated.

The transmitter-receiver pair can be used in many different applications. The most widely contemplated use is in connection with vehicles (boats, trucks, airplanes, automobiles, etc.). But the anti-theft system of our invention can also be used to control the opening of doors such as those in homes, apartments, offices, etc. and even to control the use of machinery, computers, etc. The manner in which the receiver is mounted depends, of course, on its particular application. In the case of a car, the receiver may be mounted in the trunk on the internal metal framework. The receiver should be mounted so that there is easy access to switch S2. The ignition cut-out wire 34 is preferably passed underneath the rear seat and then run to the front of the car under the carpeting along the center area of the vehicle. The wire can be passed through the firewall either via an existing hole or one that is drilled at a convenient location where the firewall is vertical (so as to insure against moisture seeping into the vehicle). Spade lug 26 on wire 34 can then be connected to the ignition coil, as will be described in connection with FIG. 3. Wire 36 should be extended to the front of the car in a similar manner, but preferably via a different route, e.g., via a cable trough running parallel with the doors on the left side of the car. The wire should be connected to a part of the electrical system which becomes "live" when the ignition system is turned on. It is also possible to mount the receiver under the front hood of the vehicle. However, since it is easier to gain access to the engine compartment than to the trunk, the preferred installation is in the trunk.

FIG. 3 shows the manner in which the three wires 32, 34 and 36 from receiver 30 are connected to the electrical system of the car in a preferred installation. Switch 52 represents the ignition switch which connects the 12-volt car battery 50 through a ballast resistor 54 to the primary winding 56 of the ignition coil. It is the secondary winding 58 of this coil that is extended to the distributor cap, as is known in the art. As is also known, the ignition coil is extended through a condenser 60 to the chassis ground, "points" 62 being used to interrupt the primary winding current so that a high-voltage pulse is extended to the distributor.

Wire 36, over which the powering potential for the receiver is supplied, is connected to resistor 54. Thus power can be extended to the receiver only when ignition switch 52 is closed. Even if the transmitter is operated, the receiver cannot remove the ground on conductor 34 in the absence of power on conductor 36. Consequently, the transmitter itself cannot be used to start the car unless the ignition system is turned on in the conventional manner.

Ground conductor 32 is shown as being connected to the chassis ground; any convenient grounding point can be selected for this purpose.

The cut-out wire 34 is shown as being connected to the grounding end of the primary side of the ignition coil. It is the opening of points 62 and the removal of a ground connection to the junction of the coils which ordinarily controls a high voltage pulse across coil 58. As long as conductor 34 is grounded, the opening of points 62 have no effect; condenser 60 remains short-circuited. It is only when receiver 30 removes the ground from conductor 34 and leaves it in a floating condition that the ignition system can be turned on. The connections of FIG. 3 are also suitable for vehicles which have electronic ignition systems.

Transmitter 10 is shown in FIG. 4. The transmitter consists of three main sections: a timing circuit, an audio oscillator, and an RF oscillator. The timing circuit insures that even though switch S1 may remain operated by the driver, the transmitter operates for no more than one second at intervals no shorter than thirty seconds. The power output of the transmitter is approximately 10–15 microwatts — more than sufficient to operate the receiver when the transmitter is turned on inside the car, even if the transmitter is operated inside a pocket or purse and is not "aimed" at the receiver. With such a low-level power output, together with the timing safeguards described above, a license to operate the transmitter is not required by the Federal Communications Commission.

During each approximately one-second interval that the transmitter is turned on, the audio oscillator generates one of fifteen tones in the 17–32 kHz range. The particular tone depends upon the setting of variable inductor L1. The tone is extended to the RF oscillator stage where it is used to amplitude-modulate the RF carrier generated by transistor Q5. The carrier is preferably in the range 220–614 MHz, one of forty possible carriers being selected depending upon the setting of variable capacitor C6. Since there are 40 possible carrier frequencies and 15 possible audio tones, the total number of tone-carrier pairs is 600.

In the quiescent state, both of transistors Q1 and Q2 remain off. Capacitor C2 is initially charged so that the base-emitter junction of transistor Q2 is reverse biased. Any charge which leaks off capacitor C2 is replaced by emitter-base current which flows through transistor Q2 and resistors R4 and R3. Although the base of transistor Q1 is extended through resistor R6 to the negative terminal of battery B1, no current flows through transistor Q1; the collector of the transistor is connected to normally open push-botton switch S1 and, through resistor R5, to unijunction transistor Q3 which is off and to diode D1 which is poled in a direction to prevent current flow from transistor Q1.

When switch S1 is first operated, transistor Q1 turns on, collector current flowing through resistor R1 and capacitor C1. The capacitor quickly charges until the voltage across it, which is applied to the gate of unijunction transistor Q3, is sufficient to turn the transistor on. At this time, collector current from transistor Q1 flows through resistor R5 and transistor Q3 to the negative terminal of the battery. Capacitor C2 also discharges through diode D1 and transistor Q3.

As capacitor C2 discharges, the voltage across it drops. From the time switch S1 is first operated, it takes less than one second for the capacitor voltage to fall to the level at which the emitter-base junction of transistor Q2 is forward biased. At this time, transistor Q2 conducts and a positive potential is developed across resistor R6. This positive potential, applied to the base of transistor Q1, turns transistor Q1 off. Thus transistor Q1 cannot deliver current to the unijunction transistor. As soon as capacitor C2 has discharged sufficiently so that the current which flows from it through transistor Q3 falls below the sustaining level of the unijunction transistor, the transistor turns off. At this time, capacitor C2 starts to charge from the emitter-base current of transistor Q2. With transistor Q1 now off, capacitor C1 discharges through resistor R2.

It requires a total of slightly less than one second from the time that switch S1 is first closed and transistor Q1 is turned on until the transistor turns off. It requires slightly more than 30 seconds after the transistor turns off until capacitor C2 charges to that level which turns off transistor Q2. It is only after transistor Q2 turns off once again that transistor Q1 can be turned on. If switch S1 is still operated at this time, the unijunction transistor is fired once again. If by this time switch S1 has been released, both of transistors Q1 and Q2 remain off, capacitor C2 remains charged, and the system is in the quiescent condition ready for the switch to be operated once again.

The purpose of diode D1 is to isolate the two timing circuits (each of which includes one of capacitors C1 and C2) from each other. Without the diode, transistor Q1 would conduct along with transistor Q2 and would extend current through resistor R5 to capacitor C2. This would reduce the "off" interval to under 30 seconds. The diode is provided so that capacitor C2 charges only from the emitter-base current of transistor Q2.

It is thus apparent that following the closing of switch S1, transistor Q1 remains on for only one second. Provided that switch S1 is held closed for at least one second, the potential of battery B1 is extended through it to power the two oscillator stages for one second. (It is to be understood that references herein to an "on" time of one second and to an "off" time of 30 seconds are to actual on times of slightly less than one second and to actual off times of slightly more than 30 seconds.) If switch S1 is held closed for more than 30 seconds, all that happens is that the process repeats itself so that transistor Q1 conducts for another one-second interval after first remaining off for 30 seconds.

The audio and RF oscillator stages are conventional circuits in all respects. For this reason detailed descriptions of their operations are not presented herein. (Particular component values for the various elements in these two stages are set forth below.) Insofar as the present invention is concerned, any conventional tunable oscillators can be used in lieu of the two oscillators shown in FIG. 4. The frequency of the audio tone is determined by capacitor C4 and tunable inductor L1. The tone is extended through resistor R11 and choke L2 to the emitter of transistor Q5, this RF transistor having a shield which is electrically connected to its emitter. The two RF chokes L2 and L3 are provided to prevent the RF carrier from being transmitted back to the audio stage, while they present a low impedance to the audio tone so that it can be extended to the RF stage to modulate the carrier frequency. The RF oscillator is of the Colpitts type and includes a variable capacitor C6 which, together with inductor L4, determines the frequency of the RF carrier. Inductor L4 also serves as the transmitter antenna and is a conventional printed circuit coil, that is, a single loop of copper foil on the printed circuit board. This type of miniature antenna is well known to those skilled in the art.

It is to be emphasized that the particular circuit of FIG. 4, while representing the preferred embodiment of the invention, is only one of many different alternatives. Any of many well known timing circuits, and audio and RF oscillators, can be used to achieve the functions required ot the transmitter.

Figure 5:
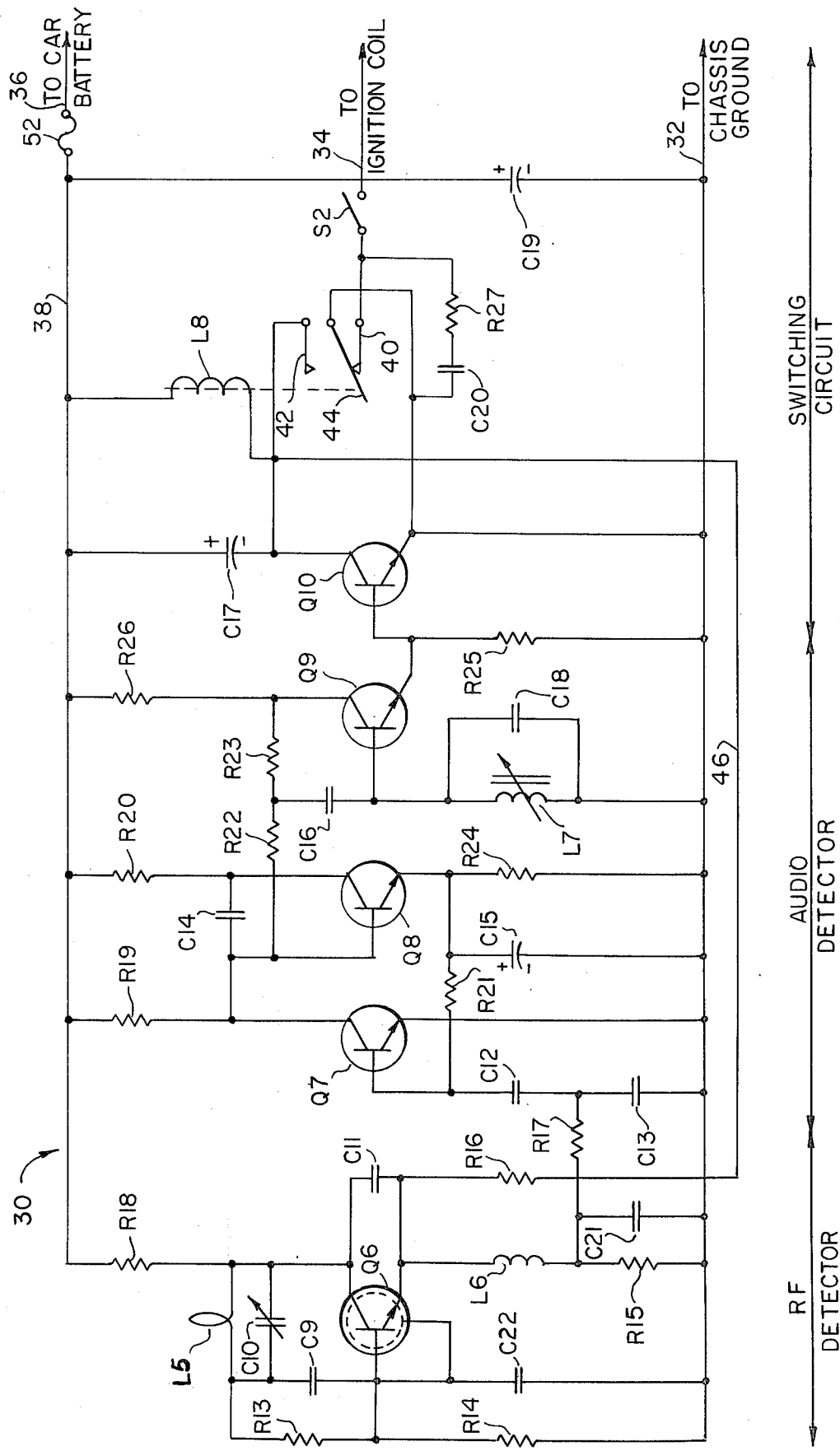
FIG. 5 depicts the circuitry of the receiver of FIG. 2.

FIG. 5 depicts the circuitry of receiver 30. The three conductors 32, 34 and 36 which are extended out of the receiver to the electrical system of the vehicle are shown at the right of the drawing, together with their designated points of connection as shown in FIG. 3. A conventional fuse 52 is included in battery wire 36 in order to prevent excessive battery drain in the event a short-circuit develops in the receiver.

The receiver includes three stages — an RF detector, an audio detector and a switching circuit. As in the case of the transmitter, there are many alternative circuits which can be used to perform the functions required of the receiver, and the circuitry shown in FIG. 5 is only illustrative. All three stages are powered by the 12-volt battery potential which appears between conductors 38 and 32, it being recalled that the battery potential is extended to conductor 38 only when the ignition switch is turned on.

The RF detector includes an RF transistor whose shield is connected to its base terminal. The detector is tuned to a carrier frequency determined by inductor L5 and variable capacitor C10. Inductor L5 is a printed circuit coil having a fixed inductance, and capacitor C10 is adjusted so that the circuit is tuned to the carrier frequency of the paired transmitter. The purpose of choke L6 is to allow ground potential on conductor 32 to be extended through resistor R15 to the emitter of transistor Q6 for biasing purposes, while at the same time decoupling the emitter from the ground conductor insofar as RF signals are concerned. The bandwidth of the RF detector is approximately 1 MHz, and when the received carrier frequency is the same as that for which the RF detector is tuned, the tone-modulated carrier is extended through resistor R17 to the audio detector. If any incorrect carrier frequency is received, the level of the signal extended to the audio detector is negligible. Also, when a carrier of the proper frequency is detected, the DC potential at the emitter of transistor Q6 rises. This DC potential is extended through resistor R16 to the switching circuit stage of the receiver for a purpose to be described below.

The audio detector stage includes a broadbank amplifying stage Q7 and a detecting stage which includes transistor Q8. The audio detector is tuned by adjusting inductor L7, this inductor together with capacitor C18 determining the frequency of the audio tone to which the stage is responsive. When the proper audio tone is detected, the potential across the parallel resonant L7-C18 circuit rises. Transistor Q9 functions as an emitter follower to extend a DC potential to the base of transistor Q10 in the switching circuit. Transistor Q10 is turned on only when the received carrier frequency and its modulating tone are those for which the receiver is designed to recognize. If the carrier frequency is not correct, the level of the signal extended to the audio detector is insufficient for turning on transistors Q9 and Q10. And even if the carrier frequency is that for which inductor L5 and capacitor C10 are tuned, if the audio tone is not that for which inductor L7 and capacitor C18 are resonant, the DC potential at the base of transistor Q9 remains insufficient for turning this transistor on.

Transistor Q10 is ordinarily non-conductive. No current flows through the coil of relay L8 and the collector-emitter circuit of the transistor, and movable contact 44 remains in the position shown. The ground potential on conductor 32 is extended through contact 44 and stationary contact 40 to switch S2. This switch is the de-activation key switch of the receiver, and as the receiver is usually operated it is closed. Consequently, in the quiescent state a ground potential is extended over conductor 34 to the ignition coil so that the ignition system cannot be turned on even if the ignition switch is operated and the battery potential is extended over conductor 36 to the receiver.

But as soon as transistor Q10 turns on, current flows through it and the coil of relay L8. At this time, contact 44 switches to engage contact 42. With the opening of the normally closed contacts, the ground potential on conductor 34 is removed and the ignition system can be operated. Conductor 34 remains floating as long as contact 44 does not re-engage contact 40. In order to insure that relay L8 does not de-energize when transistor Q10 turns off after having operated for approximately one second, contact 42 is provided. As soon as contact 44 engages contact 42, the ground potential on conductor 32 is extended through the two contacts to the relay coil. Thus holding current for the relay is provided around a path which by-passes transistor Q10. Relay L8 remains energized as long as battery potential appears on conductor 38.

After the car is parked and the ignition switch is turned off, the battery potential no longer appears on conductor 38. Relay L8 releases and contact 44 once again grounds conductor 34. The anti-theft system is thus automatically re-armed without anything being required of the driver other than the usual action of turning the engine off. Even if the key is left in the car, the ignition system cannot be started once again without first energizing relay L8, and this requires operation of the transmitter.

Capacitor C20 and resistor R27 are connected across the normally closed contacts to prevent arcing when the contacts are slightly separated from one another and a high potential appears on conductor 34.

It should be noted that the DC potential which is developed at the emitter of transistor Q6 in the RF detector (when the carrier frequency which is received is that for which the detector is tuned) is extended through resistor R16 and over conductor 46 to the collector of transistor Q10. The reason for this is to de-sensitize relay L8. This relay has a coil impedance of 5,000 ohms and therefore can be energized by a very low current. If the correct carrier frequency is detected, transistors Q9 and Q10 may turn partially on even if the modulating tone is not that for which the audio detector is designed to recognize. This is because some RF "hash" extended to the audio detector stage may result in the partial turning on of transistors Q9 and Q10. In such a case, relay L8 would energize for any carrier of the proper frequency, even one which is modulated with an incorrect audio tone. By extending a slightly positive potential to the collector of transistor Q10 when the RF detector detects the proper carrier frequency, less than the full battery voltage appears across the coil of relay L8. It is only when transistor Q10 is driven to saturation — when the proper audio tone is detected along with the proper carrier frequency — that the lower end of the relay coil is grounded through the transistor to overcome the desensitizing effect of the slightly positive potential on conductor 46.

As in the case of the transmitter of FIG. 4, it is to be emphasized that the particular circuit shown in FIG. 5 for the receiver is only illustrative. Many different conventional RF an audio detectors, and switching circuits can be used to provide the functions required of the receiver.

In the illustrative embodiment of the invention depicted in FIGS. 4 and 5, the various components have the following magnitudes or are of the following types:

| RESISTORS | |
|---|---|
| R1=33 K | R15=18 K |
| R2=10 K | R16=390 K |
| R3=33 ohms | R17=10 K |
| R4=100 K | R18=12 K |
| R5=1 K | R19=10 K |
| R6=47 K | R20=510 ohms |
| R7=330 ohms | R21=1 M |
| R8=15 K | R22=1 M |
| R9=7.5 K | R23=150 K |
| R10=4.7 K | R24=240 ohms |
| R11=680 ohms | R25=10 K |
| R12=47 K | R26=43 K |
| R13=68 K | R27=10 ohms |
| R14=68 K | |
| CAPACITORS | |
| C1=10 U.F. | C12=.001 U.F. |
| C2=100 U.F. | C13=.002 U.F. |
| C3=6.8 U.F. | C14=4.7 P.F. |
| C4=2700 P.F. | C15=15 U.F. (tantalum) |
| C5=10 P.F. | C16=12 P.F. |
| C6=1-5 P.F. | C17=4.7 U.F. (tantalum) |
| C7=1.2 P.F. | C18=2200 P.F. |
| C8=10 P.F. | C19=100 U.F. (tantalum) |
| C9=27 P.F. | C20=.01 U.F. |
| C10=2-10 P.F. | C21=.001 U.F. |
| C11=2.2 P.F. | C22=.01 U.F. |
| INDUCTORS | |
| L1=5-8 U.H. | L5=P.C. coil |
| L2=1.5 U.H. | L6=1.5 U.H. |
| L3=1.5 U.H. | L7=5-8 U.H. |
| L4=P.C. coil | L8=12-V, 5000-ohm relay |
| TRANSISTORS | |
| Q1=MPS6534 | Q6=RCA40243 |
| Q2=MPS6534 | Q7=IRTR-51 |
| Q3=2N5061 | Q8=INTR-51 |
| Q4=IRTR-51 | Q9=IRTR-51 |
| Q5=RCA40243 | Q10=IRTR-51 |
| DIODE | |
| D1=IN60 | |

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. An anti-theft system for a vehicle having a passenger compartment and another compartment which is normally inaccessible to a person within the passenger compartment comprising a transmitter adapted for carrying by an authorized driver and having switch means thereon, said transmitter being operative responsive to the operation of said switch means for transmitting an access identification wireless carrier signal of predetermined frequency which is modulated by a tone of predetermined frequency for identifying an authorized operator; and means mounted in said inaccessible vehicle compartment, said vehicle-mounted means including means for detecting said access identification wireless carrier signal of said predetermined frequency modulated by said tone of predetermined frequency for origination within said inaccessible compartment a control signal indicative of the operation of said transmitter by a person desiring to operate the vehicle, means connected to the vehicle ignition system and being normally operative for disabling the vehicle ignition system, and means connected to said detecting means, the electrical system of the vehicle and said disabling means for inhibiting the operation of said disabling means responsive to the ignition switch of the vehicle being turned on and the initial origination of said control signal to allow the ignition system to operate and to remain operated, even after said detecting means ceases to operate, until the ignition switch is turned off.

2. An anti-theft system in accordance with claim 1 wherein said transmitter further includes means for inhibiting the transmission of said carrier signal continuously for more than approximately one second and for preventing the transmission of said carrier signal until at least approximately thirty seconds have elapsed following a previous transmission of said carrier signal independent of the operation of said switch means.

3. An anti-theft system in accordance with claim 1 wherein said disabling means is operative to disable the vehicle ignition system in the event the connection of said inhibiting means to the vehicle electrical system is cut.

4. An anti-theft system in accordance with claim 3 wherein said disabling means is connected to the vehicle ignition coil and is normally operative to apply a disabling potential thereto to prevent the proper operation thereof.

5. An anti-theft system in accordance with claim 3 further including a key operable means on said vehicle-mounted means and connected to said disabling means for selectively preventing the operation of said disabling means independent of the operation of said inhibiting means.

6. An anti-theft system in accordance with claim 5 further including key means for operating said key operable means, and means for securing said key means to said transmitter.

7. An anti-theft system in accordance with claim 1 wherein said disabling means is connected to the vehicle ignition coil and is normally operative to apply a disabling potential thereto to prevent the proper operation thereof.

8. An anti-theft system in accordance with claim 1 further including key operable means on said vehicle-mounted means and connected to said disabling means for selectively preventing the operation of said disabling means independent of the operation of said inhibiting means.

9. An anti-theft system in accordance with claim 8 further including key means for operating said key operable means, and means for securing said key means to said transmitter.

* * * * *